United States Patent Office 3,041,160
Patented June 26, 1962

3,041,160
STABILIZED PLANT NUTRIENT COMPOSITION
Benjamin Makower, El Cerrito, and Gustave K. Kohn, Berkeley, Calif.
No Drawing. Filed Aug. 10, 1960, Ser. No. 48,571
2 Claims. (Cl. 71—64)

The present invention relates to a plant nutrient composition in the form of a stable thixotropic gelled mixture. More particularly, the invention consists in a stable, balanced plant nutrient composition, which contains agronomically effective quantities of at least one element of nutritional value to plants, and a method for its preparation.

U.S. Patent No. 2,799,569 discloses a process for manufacturing a fertilizer in the form of a thixotropic gel from what is called a "crude wet process phosphoric acid" by means of a relatively high temperature (140–190° F.) ammoniation process. It has been experimentally determined, however, that in order to obtain their product which was stated to have been stable after 24 hours by means of a process carried out within their temperature range, the aluminum content of the final mixture was stated to be, and was, of necessity, relatively large. Aluminum is of little or no nutrient value for plants. In spite of this, however, the crude acid used in that patent was restricted to those acids containing relatively high levels of this agronomically valueless element.

The present invention provides a balanced plant nutrient composition containing agronomically effective amounts of certain elements which would be expected to cause instability and precipitation, which may be prepared from any phosphoric acid feed stock and which remains stable even after long storage periods in a gelled, but flowable state.

As little as 0.1 percent of only one of the agronomically effective plant nutrient elements, e.g., iron, manganese, copper, and zinc, will cause precipitation in the final product during storage, thus rendering it unstable and therefore commercially unsuitable. To prevent this precipitation and settling, it has been unexpectedly discover that by regulating the concentration of a stabilizing agent, e.g., ferric iron, aluminum, or mixtures thereof, within critical limitations based on amount of final product, this mixture can be converted into a stable, thixotropic, gelled, plant nutrient composition which remains in this gelled form throughout prolonged storage, but is not so unduly thick as to be nonflowable.

The novel process of the invention comprises regulating the concentration of a stabilizing agent consisting of a trivalent metal selected from the group consisting of ferric iron, aluminum, and mixtures thereof, in a phosphoric acid solution containing 0.1 to about 0.5 weight percent of at least one of the nutritionally valuable elements selected from the group consisting of iron, manganese, copper, and zinc to arrive at a total concentration of stabilizing agent in said acid solution from about 0.02 to about 0.05 mol stabilizing agent per 100 grams product, treating said solution with a sufficient amount of ammonia to produce a finished plant nutrient composition having a ratio of $P_2O_5$:N of about 3:1 while maintaining said solution at a temperature between about 100–135° F. and continuously agitating the mixture.

By utilizing the process of the invention wherein the concentration of stabilizing agents are regulated within these relatively low critical limitations, it is possible to use any phosphoric acid feed. A high level of aluminum is neither required nor desirable, as aluminum is of little or no plant nutrient value.

It has been found that the temperature should be in the range of about 100–135° F. At this temperature complete reaction is obtained. These low temperatures provide still further advantages of the process, since considerably less agitation is required thus saving a great deal of costly process equipment, corrosion is more likely to occur at higher temperatures, and ammonia losses at higher temperatures are much greater. Moreover, if a temperature is employed outside the stated range, it has been found that the products are unstable and commercially impractical because they separate after relatively short periods of time. A product prepared at 170° F., for example, while remaining stable for a day or so, separated and settled during storage periods of durations expected in commercial usage.

In order to attain a commercially useful, stable product according to the teachings of the art, it was found that an amount of aluminum had to be present in the mixture greatly in excess of that required by this invention. This requirement severely limited the freedom of choice of acids utilized in the processes of the prior art, and moreover, provided no added nutrient value for the plants. According to the invention, the amounts of stabilizing agents must be within the disclosed limitations. If amounts are added which are outside of this critical range—0.02–0.05 mol stabilizing agent per 100 grams product—the product will either settle immediately with no gelling at all, precipitate during storage, or become so thick as to be nonflowable and hence extremely difficult to handle.

The process is carried out by preparing a mixture of phosphoric acid and the desired amounts of the nutrient elements and stabilizing agents; the acid employed may be any commercial grade phosphoric acid. If desired, it may be a substantially clear acid to which the desired nutrient elements and stabilizers are added, or it may be an impure acid which may or may not contain portions of the nutrient elements and/or stabilizing agents. In this event, sufficient additional quantities of nutrient elements and/or stabilizing agents are added to the acid to arrive at their desired or required concentrations.

To the resulting acid mixture is added the amount of ammonia necessary to arrive at a final product which has a ratio of phosphorus, measured in the form of $P_2O_5$, to nitrogen of about 3:1. The ammonia employed may be in the form of ammonia gas or an aqueous solution. Because of the heat evolved by the neutralization process, the mixture is cooled during the addition of ammonia, such as by use of a heat exchanger, and the temperature thereby maintained at about 100–135° F.

According to the invention, it is possible to tailor-make plant nutrient compositions containing up to 0.5 percent of any or all of the nutrient metals, i. e., iron, manganese, copper, and zinc, chosen according to the deficiencies of the particular soil on which the product is to be used, without the danger of forming an unstable or difficult-to-handle mixture. It is only necessary to add the required quantities of the stabilizing agents disclosed to be certain of a product which is a flowable, commercially desirable, thixotropic gel that remains stable even after prolonged storage. It has been found that even though the gel suspension is broken in rough handling, it reforms of its own accord upon standing, thus maintaining its highly desirable state.

The process may be carried out batchwise as above described, or may be conducted in a continuous or semi-continuous manner by continually withdrawing about 10 percent or less of the mixture as product while recycling the remainder to the reaction zone for further reaction, according to methods known in the art.

The examples which follow show the improvements obtained by employing the process of the invention and the advantages of the disclosed temperature range. The results of Example 1 compared with Examples 2 and 3 show the criticality of including only the disclosed amount of stabilizing agent—0.02–0.05 mol stabilizing agent per 100 grams product. Examples 4 and 5 show the importance of temperature.

*Example 1*

To a clear phosphoric acid solution of 85 percent concentration, 0.1 percent zinc, and 0.1 percent manganese in the form of their sulfates were added to obtain a balanced plant nutrient for a soil deficient in these elements. To this mixture, 0.042 mol aluminum (also in the form of sulfate) per 100 grams product was added. Then a sufficient quantity of ammonia was added to the solution to furnish the ammoniated product with enough nitrogen to have a ratio of phosphorous, measured in the form of $P_2O_5$, to nitrogen of about 3:1. During ammoniation, the mixture was agitated and maintained at a temperature of about 110–120° F. The product formed was a firm, thixotropic gel in which the nutrient elements were uniformly suspended throughout the body of the solution. The settling tendency of the solids was very slight. The gel could be broken by agitation, but reformed again on standing, hence the product was considered quite satisfactory for commercial utilization.

*Example 2*

A plant nutrient composition was prepared exactly as in Example 1 except that only 0.004 mol aluminum, less than the critical amounts required by the invention, was added per 100 grams product. A precipitate of metal salts very quickly settled to the bottom of the vessel. A clear supernatant liquid occupied 93 percent of the total volume. There was no gel formation whatsoever.

*Example 3*

A third composition was prepared as in Example 1 except that this time 0.074 mol aluminum, greatly in excess of the critical amounts required by the invention, was added per 100 grams product. The product was a very thick, cream-like jelly which was nonflowable and was, therefore, considered unsuitable for commercial utilization.

*Example 4*

A plant nutrient composition was prepared from a commercially obtained phosphoric acid solution according to the invention at 110° F. having a ratio of $P_2O_5$:N of 3:1 and containing 0.37 weight percent iron and .025 mol aluminum per 100 grams product. The product obtained was a firm but flowable thixotropic gel showing separation of only 0.8 percent of the total volume into supernatant liquid after 50 days.

*Example 5*

A product was prepared as in Example 4 except that a temperature of 170° F. was employed rather than 110° F. as taught by the present invention. After 50 days, 28 percent of the volume separated into supernatant liquid, indicating a commercially unsatisfactory product.

The foregoing examples should not be considered as limitations on the scope of the invention. As will be evident to those skilled in the art, various modifications can be made or followed, in the light of the foregoing disclosure, without departing from the spirit or scope of the invention or from the scope of the following claims.

We claim:

1. A process for making a stable thixotropic inorganic plant nutrient composition containing phosphorus and nitrogen in a ratio of $P_2O_5$:N of about 3:1 and also containing 0.1 to about 0.5 percent of at least one of the elements selected from the group consisting of iron, manganese, copper, and zinc uniformly suspended and distributed throughout said composition, which comprises: regulating the concentration of a stabilizing agent selected from the group consisting of ferric iron, aluminum, and mixtures thereof in a phosphoric acid solution containing at least one of said elements to arrive at a total concentration of stabilizing agent in said acid solution from about 0.02 to about 0.05 mol stabilizing agent per 100 grams product; treating said solution with a sufficient amount of ammonia to produce a finished plant nutrient composition having said $P_2O_5$:N ratio of about 3:1 while maintaining said crude acid solution at a temperature between about 100–135° F. and continuously agitating the mixture.

2. A continuous process according to claim 1 wherein less than about 10 percent of the mixture resulting after ammoniation is withdrawn as product and the remainder recycled for further treatment with ammonia.

References Cited in the file of this patent

UNITED STATES PATENTS

| | | |
|---|---|---|
| 2,770,540 | Vierling | Nov. 13, 1956 |
| 2,879,151 | Melville | Mar. 24, 1959 |